(12) United States Patent
Shimizu et al.

(10) Patent No.: US 8,488,585 B2
(45) Date of Patent: Jul. 16, 2013

(54) MOBILE STATION AND METHOD OF RECONNECTION PROCESS

(75) Inventors: Seiko Shimizu, Yokohama (JP);
 Masayuki Furusawa, Yokohama (JP);
 Taro Ishikawa, Yokohama (JP);
 Toshiyuki Futakata, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 305 days.

(21) Appl. No.: 12/991,333

(22) PCT Filed: May 7, 2009

(86) PCT No.: PCT/JP2009/002009
§ 371 (c)(1),
(2), (4) Date: Nov. 5, 2010

(87) PCT Pub. No.: WO2009/136502
PCT Pub. Date: Nov. 12, 2009

(65) Prior Publication Data
US 2011/0065437 A1 Mar. 17, 2011

(30) Foreign Application Priority Data

May 8, 2008 (JP) ................................. 2008-122440

(51) Int. Cl.
 *H04J 3/06* (2006.01)
(52) U.S. Cl.
 USPC ........ 370/350; 370/216; 370/331; 370/395.2; 370/395.62; 455/435.1; 455/436; 455/502
(58) Field of Classification Search
 USPC .................. 455/435.1, 436.2, 436, 442, 435, 455/502, 524, 525, 550.1; 370/216, 324, 370/331, 350, 395.62, 503, 516, 517
 See application file for complete search history.

(56) References Cited

U.S. PATENT DOCUMENTS 6,501,947 B1 12/2002 Hunzinger et al.
6,996,412 B2 2/2006 Hunzinger et al.
(Continued)

FOREIGN PATENT DOCUMENTS

JP 09-289679 11/1997
JP 2003-518852 6/2003
WO WO 01/47299 A1 6/2001

OTHER PUBLICATIONS

PCT/JP2009/002009 PCT/IB/338.
(Continued)

*Primary Examiner* — Anthony Addy
*Assistant Examiner* — Amanuel Lebassi
(74) *Attorney, Agent, or Firm* — Crowell & Moring LLP

(57) ABSTRACT

There is provided a mobile station that minimizes a pause or a silent period during communication at the time of a reconnection process of communication, thereby to improve the user's convenience and achieve the reduction in the load applied onto the communication network or the mobile station. When an out of synchronization detection unit 4 of a mobile station 2 detects out of synchronization, an individual timer value determination unit 53 selects two or more timer value change triggers from timer value change triggers stored in a timer value change trigger memory 51, and then determines the timer values respectively for the timer value change triggers that have been selected, based upon the determination rules stored in an individual timer value determination rule memory 52. A reconnection timer value calculation unit 54 calculates an appropriate reconnection timer value based upon the two or more individual timer values that have been determined by the individual timer value determination unit 53. A timer switching control unit 5 sets the reconnection timer value, and a timer management unit 6 activates a timer. When the timer expires, a radio communication unit 3 transmits a reconnection request.

5 Claims, 4 Drawing Sheets

U.S. PATENT DOCUMENTS

2002/0183055 A1* 12/2002 Hunzinger et al. ........... 455/424
2008/0076434 A1* 3/2008 Shigaki et al. ................ 455/442

OTHER PUBLICATIONS

PCT/JP2009/002009 PCT/IB/373.
PCT/JP2009/002009 PCT/ISA/237 (Translation).
PCT/JP2009/002009 PCT/ISA/210.
ASUSTeK, "Handling of Radio Link Failure", 3GPP TSG-RAN WG2 #55, Oct. 9-Oct. 13, 2006, R2-062893, Seoul, Korea, 3 pages.
Chinese Office Action (w/English Translation), dated Oct. 30, 2012, 10 pages total.

* cited by examiner

*FIG. 3*

| | TIMER VALUE CHANGE TRIGGER | LENGTH OF TIMER | |
|---|---|---|---|
| | | SHORT | LONG |
| 1 | QOS CLASS | HIGH PRIORITY | LOW PRIORITY |
| 2 | BEARER IN CONNECTION | LTE | UMTS |
| 3 | USE STATUS OF BUFFER | LARGE | SMALL |
| 4 | RETRANSMISSION STATE | LOTS OF RETRANSMISSIONS | A FEW RETRANSMISSIONS |
| 5 | THROUGHPUT | HIGH | LOW |
| 6 | QUALITY GRADIENT | LOTS OF ERRORS | A FEW ERRORS |
| 7 | PRESENCE OF AN INTERFERENCE FROM ANOTHER BASE TRANSCEIVER STATION | YES | NO |
| 8 | THE NUMBER OF NEIGHBORING CELLS | MANY | A FEW |
| 9 | WHETHER OR NOT MOVING THROUGH TA (TRACKING AREA) | NO | YES |
| 10 | MOVING SPEED | FAST | SLOW |
| 11 | THE NUMBER OF CELL HANDOVERS | MANY | A FEW |
| 12 | DESIGNATION OF THE TIMER VALUE FROM THE NETWORK | DESIGNATED VALUE | |

(columns 51 and 52)

| Name of QCI Characteristic | SERVICE EXAMPLE | LENGTH OF TIMER |
|---|---|---|
| 1 (GBR) | Realtime Gaming | ↑ SHORT |
| 2 (GBR) | VoIP | |
| 3 (GBR) | Conversational Packet Switched Video | |
| 4 (GBR) | Streaming | |
| 5 (non-GBR) | IMS signalling | |
| 6 (non-GBR) | Interactive Gaming | |
| 7 (non-GBR) | TCP interactive | |
| 8 (non-GBR) | Preferred TCP bulk data | |
| 9 (non-GBR) | Best effort TCP bulk data | ↓ LONG |

MOBILE STATION AND METHOD OF RECONNECTION PROCESS

TECHNICAL FIELD

The present invention relates to a mobile station that executes a reconnection process of communication and a method of reconnection process executed by the mobile station.

BACKGROUND ART

Conventionally, a mobile station executes a reconnection process at the time of handover failure or becoming out of synchronization. Since the reconnection process increases traffic of the networks, it is controlled not to be performed until the last minute of the permissible limit. Specifically, the mobile station sets a predetermined timer value and activates a timer, at the time of detecting the handover failure or out of synchronization. When the timer expires, the mobile station transmits a reconnection request to a connection target to execute the reconnection process. In this case, the timer value to be set is a fixed one, thereby generating a certain non-communication period in any situation. When out of synchronization or the like occurs while users are talking, a pause or silent period continues. This causes users to execute the disconnection process and make a telephone call again. Also, the communication continues even while a pause or silent period is continuing, and the call fee is charged in some cases. Additionally, cells are searched for during the reconnection process, so the power of the mobile station is wasted. Besides, there is a drawback that the frequency band is occupied.

In Patent Document 1, in order to prevent the competition for resources at the time of reconnection process, mobile stations or base transceiver stations collect data that affect the reconnection collisions or competition for resources, so that the reconnection timer value is determined based upon the collected data. The collected data include the quantity and distribution of the connection request, the number of available resources, expected duration of each connection, expected duration of each connection at the current point of time, priority index of the connection request, the expected number of new connection requests, and the like.

RELATED ART

Patent Document

Patent Document 1: JP 2003-518852 A

SUMMARY OF THE INVENTION

Problem to be Solved by the Invention

In Patent Document 1, however, there is no detailed description of how to calculate the reconnection timer value based upon the collected data. The data to be collected in Patent Document 1 are data of different dimensions such as numerical values, periods of time, and the like. It is therefore difficult to determine an appropriate reconnection timer value based upon such data of different dimensions.

The present invention has been made to address the above conventional drawback, and it is an object of the present invention to determine an appropriate reconnection timer value so as to provide a mobile station that minimizes a pause or silent period at the time of a reconnection process of communication, thereby to improve the user's convenience, and to reduce the load applied onto the communication network or the mobile station.

Means of Solving the Problems

According to an aspect of the present invention, there is provided a mobile station that sets a reconnection timer value to activate a timer at the time of a reconnection process of communication and that transmits a reconnection request to a connection target when the timer expires, the mobile station comprising: a timer value change trigger memory for storing a plurality of timer value change triggers; an individual timer value determination rule memory for storing determination rules of individual timer values respectively corresponding to the plurality of timer value change triggers stored in the timer value change trigger memory; an individual timer value determination unit for selecting at least two timer value change triggers from the plurality of timer value change triggers stored in the timer value change trigger memory, and for determining at least two individual timer values respectively corresponding to selected timer value change triggers based upon the determination rules stored in the individual timer value determination rule memory; and a reconnection timer value calculation unit for calculating the reconnection timer value based upon said at least two individual timer values determined by the individual timer value determination unit.

In the above configuration, the mobile station selects two or more timer value change triggers from multiple timer value change triggers, determines each of the timer values for each of the timer value change triggers that have been selected, based upon the determination rules, and then calculates the reconnection timer values based upon the two or more timer values that have been determined. It is therefore possible to calculate an appropriate reconnection timer value with ease with the use of each of the timer values having a unified dimension. Accordingly, it is made possible to minimize a pause or silent period of communication and improve the user's convenience at the time of reconnection process of communication, and to achieve the reduction in the load applied onto the communication network and the mobile station.

Preferably, the reconnection timer value calculation unit calculates an average value of said at least two individual timer values determined by the individual timer value determination unit, as the reconnection timer value.

In the above configuration, it is possible to calculate an appropriate reconnection timer value with ease by taking the average value of the timer values for the two or more timer value change triggers.

Further preferably, the reconnection timer value calculation unit weights said at least two individual timer values determined by the individual timer value determination unit, and then calculates the average value of the said at least two individual timer values being weighted, as the reconnection timer value.

In the above configuration, it is possible to calculate an appropriate reconnection timer value with ease by taking the average value of the timer values for the two or more timer value change triggers after weighting the timer values for the two or more timer value change triggers.

Further preferably, the plurality of timer value change triggers include at least one of a QoS (Quality of Service) class, a bearer of the mobile station in connection, a data amount stored in a buffer memory provided in the mobile station, a data retransmission frequency, a throughput, a communication error quantity, presence of a radio wave interference, the number of neighboring cells, whether or not the mobile station moves through tracking areas, a moving speed of the mobile station, and the number of cell handovers.

In the above configuration, by use of the timer value change trigger that affects the load applied onto the network or the mobile station or that affects the determination of whether or not the reconnection request should be made immediately, an appropriate reconnection timer value can be calculated.

In addition, according to another aspect of the present invention, there is provided A method of reconnection process to be executed by a mobile station when a chance for a reconnection of communication arrives, the mobile station comprising a timer value change trigger memory for storing a plurality of timer value change triggers, and a individual timer value determination rule memory for storing determination rules of individual timer values respectively corresponding to the plurality of timer value change triggers stored in the timer value change trigger memory, the method comprising: selecting at least two timer value change triggers from the plurality of timer value change triggers stored in the timer value change trigger memory, and determining at least two individual timer values respectively corresponding to selected timer value change triggers, based upon the determination rules stored in the individual timer value determination rule memory; calculating the reconnection timer value to be used for counting a period of time until a reconnection request is transmitted, based upon said at least two individual timer values determined; activating a timer by setting at the timer the reconnection timer value calculated; and transmitting the reconnection request to a connection target when the activated timer expires.

Effect of the Invention

According to an aspect of the present invention, a mobile station selects at least two timer value change triggers from multiple time value change triggers, determines a timer value for each of the timer value change triggers that have been selected, based upon the determination rule, and calculates a reconnection timer value base upon each of at least two timer values that have been selected. This enables the calculation of an appropriate reconnection timer value with ease by use of at least two timer values with a unified dimension. It is therefore possible to minimize a pause or silent period of communication and thereby improve the user's convenience at the time of reconnection process of communication, and to achieve the reduction in the load applied onto the communication network and the mobile station.

BRIEF DESCRIPTION OF THE DRAWINGS

FIG. 3 is a view illustrative of an example of determination rules for individual timer values with respect to respective timer value change triggers according to an embodiment of the present invention;

BEST MODE FOR CARRYING OUT THE INVENTION

Figure 1:
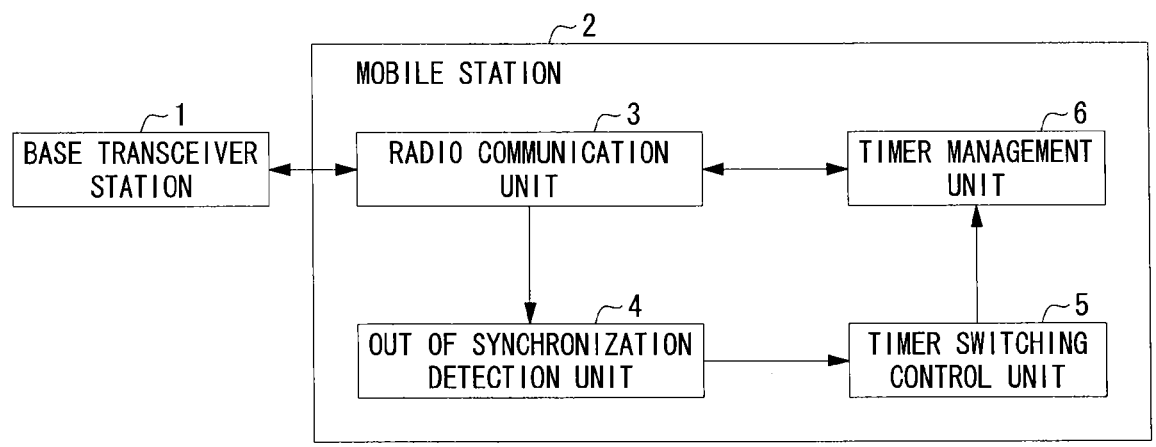
FIG. 1 is a view illustrative of the whole configuration of a communication system according to an embodiment of the present invention.

Hereinafter, embodiments of the present invention will be described with reference to accompanying drawings. In each of the drawings to be referred to in the following description, like components will be identified with like reference numerals.

(Configuration)

FIG. 1 is a view illustrative of the whole configuration of a communication system according to an embodiment of the present invention. Referring to FIG. 1, the communication system includes a base transceiver station 1 and a mobile station 2. In FIG. 1, only a single base transceiver station 1 is illustrated, but in reality there are multiple base transceiver stations. Each of the base transceiver stations 1 relays radio communication of the mobile stations 2 that exist in an area (hereinafter, referred to as "cell") where each base transceiver station 1 manages the radio communication.

The mobile station 2 is configured to be communicable with the base transceiver station 1 that manages and covers the cell where the mobile station 2 is located (hereinafter, referred to as "belonging cell"). The mobile station 2 includes a CPU (Central processing Unit), an internal clock that counts the time, a non-volatile memory for storing software of programs and data, a volatile memory to be used for a temporary memory such as a buffer memory or the like, a radio communication interface, and the like, which are not illustrated. The functional configuration of the mobile station 2 illustrated in FIG. 1 is achieved by the above hardware and software operating in cooperation with each other. The mobile station 2 is provided with: a radio communication unit 3; an out of synchronization detection unit 4; a timer switching control unit 5; and a timer management unit 6, as functional components.

The out of synchronization detection unit 4 detects out of synchronization when not receiving an acknowledgement (ACK) for data that the mobile station 2 has transmitted to the base transceiver station 1 of the belonging cell.

When the out of synchronization detection unit 4 detects out of synchronization, the timer switching control unit 5 calculates the reconnection timer value that should be counted by the timer and that means a period of time before the reconnection request is transmitted, and sets the reconnection timer value in a predetermined memory region for the reconnection timer.

The timer management unit 6 activates the timer for time management. In other words, the timer management unit 6 starts counting the period of time from the time when the timer is activated. When the timer value that has been set is counted, the timer management unit 6 determines that the timer has expired. In the present embodiment, the timer values to be set include the above reconnection timer value and a retransmission timer value for counting the period of time until retransmission is carried out. Hereinafter, the timer that counts the period of time based upon the reconnection timer value will be referred to as "reconnection timer", and the timer that counts the period of time based upon the retransmission timer value will be referred to as "retransmission timer".

The radio communication unit 3 carries out a radio access control, cell search, and communication in circuit switching or packet switching services. For instance, the radio communication unit 3 transmits a reconnection request to a base transceiver station 1 of another cell, when out of synchronization occurs and the activated reconnection timer expires. In addition, when out of synchronization occurs, the radio communication unit 3 carries out the retransmission to the base transceiver station 1 of the belonging cell up to the upper limit of the number of retransmissions every time the retransmission timer expires.

Incidentally, the triggers of the activation of the reconnection timer include: a case where the reconnection request is transmitted to the base transceiver station 1 of another cell due to the out of synchronization occurs with the base transceiver station 1 of the belonging cell; and a case where the reconnection request is transmitted to the base transceiver station 1 of the belonging cell due to the handover failure to the base transceiver station 1 of another cell. In the present embodiment, however, only the case of the out of synchronization will be described as a trigger of the activation of the reconnection timer.

Figure 2:
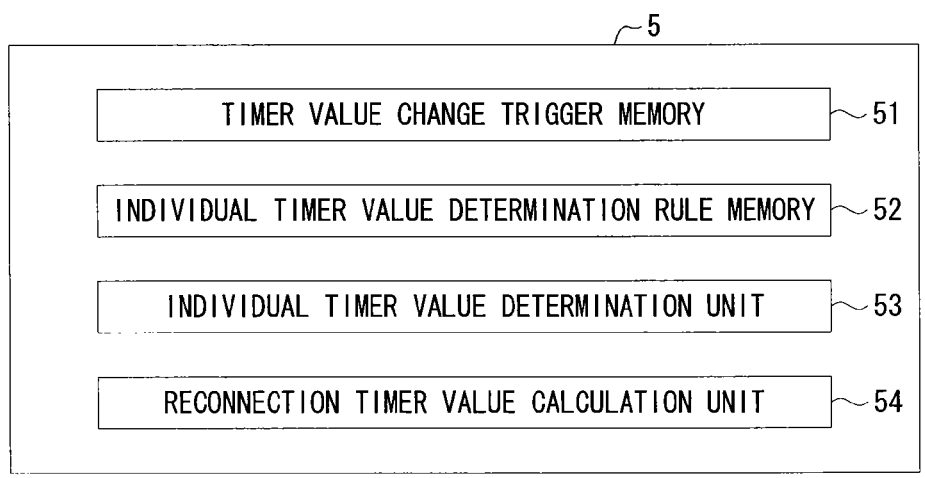
FIG. 2 is a block diagram illustrative of functional components of a timer switching control unit of a mobile station according to an embodiment of the present invention.
Figures 4, 5:
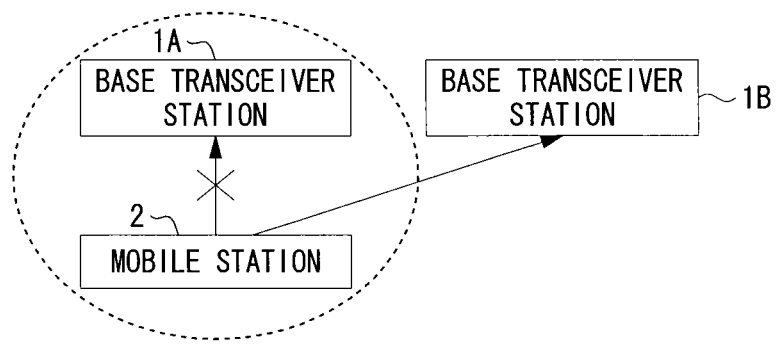
FIG. 4 is a view illustrative of an example of the determination rules for the individual timer values in each QoS class in the case where the bearer of the mobile station in connection is LTE (Long term Evolution) according to an embodiment of the present invention.
FIG. 5 is a view illustrative of the state where the mobile station executes a reconnection process to a base transceiver station of another cell due to out of synchronization with a base transceiver station that manages a cell where the mobile station is located according to an embodiment of the present invention.

Next, functional components of the timer switching control unit 5 will be described in detail. FIG. 2 is a block diagram illustrative of the functional components of the timer switching control unit 5. As illustrated in FIG. 5, the timer switching control unit 5 is provided with: a timer value change trigger memory 51; an individual timer value determination rule memory 52; an individual timer value determination unit 53; and a reconnection timer value calculation unit 54.

The timer value change trigger memory 51 stores multiple timer value change triggers. Such multiple timer value change triggers include QoS (Quality of Service) class of communication of the mobile station 2, bearer of the mobile station 2 in connection, data amount temporarily stored in a buffer memory provided in the mobile station 2, retransmission frequency of data transmitted from the mobile station 2, throughput of the mobile station 2 in communication, communication error quantity, presence of a radio wave interference, the number of neighboring cells that exist near the belonging cell of the mobile station 2, whether or not the mobile station 2 moves through tracking areas (TA: Tracking Area) which means that the mobile station 2 is located in the boundary between two TAs and is moving to another TA, the moving speed of the mobile station 2, the number of cell handovers indicating the number of the cells overlapping each other at a place where the mobile station 2 exists, and the like. Incidentally, TA represents a location management area composed of multiple cells, and is handled as the unit of location registration of the mobile station 2.

The individual timer value determination rule memory 52 stores determination rules for the individual timer values with respect to the respective timer value change triggers stored in the timer value change trigger memory 51. FIG. 3 is a view illustrative of an example of the determination rules for each of the timer values with respect to the respective timer value change triggers. As illustrated in FIG. 3, for example, in a case where the timer value change trigger is a "QoS class" and the priority of the QoS class is high, the rule is set to make the timer shorter; in other words, each of the timer values is made shorter.

FIG. 4 is a view illustrative of an example of the determination rules for the respective timer values in each QoS class in the case where the bearer of the mobile station 2 in connection is LTE (Long term Evolution). In the LTE, QoS is categorized into nine classes, and the determination rule for each timer value can be set for each class. The class "1" in the "Name of CQI Characteristic" has the highest priority in FIG. 4, and the priority level is lowered as the number of the "Name of CQI Characteristic" is greater. The rules are set such that the length of the timer is made short for the data with high priorities, so that the reconnection process can be executed immediately.

Referring back to FIG. 3, in the case where the timer value change trigger is the "bearer in connection" and the bearer in connection is LTE, it is possible to make a connection in a short period of time. Accordingly, the rule is set to make the timer length short. Meanwhile, in the case where the bearer in connection is UMTS (Universal Mobile Telecommunications System), it takes time for connection. Therefore, the rule is set to make the timer length long.

In the case where the timer value change trigger is the "use status of a buffer" and there is a large amount of data accumulated in the buffer provided in the mobile station 2, it is efficient to reconnect early and transmit the data accumulated in the buffer. Accordingly, the rule is set to make the timer length short.

Additionally, in the case where the timer value change trigger is the "retransmission state" and there is a large number of the retransmissions of data, early reconnection is more efficient than repeating the retransmission. Accordingly, the rule is set to make the timer length short.

Further, in the case where the timer value change trigger is the "throughput" and the throughput of the mobile station 2 at the time of communication is high, the processing capacity is high and the reconnection will not place the processing load. Accordingly, the rule is set to make the timer length short so that the reconnection is carried out soon.

Additionally, in the case where the timer value change trigger is the "quality gradient" and there are lots of communication errors in the mobile station 2, the reconnection is more efficient than the retransmission of data. Accordingly, the rule is set to make the timer length short.

Further, in the case where the timer value change trigger is the "whether or not there is an interference from another base transceiver station", and, for example, when it is determined that there is an interference with the base transceiver station 1 of another cell based upon the desired wave to the interference wave ratio that has been measured by the mobile station 2, the communication error easily occurs. Accordingly, since early reconnection is more efficient than the retransmission of data, the rule is set to make the timer length short.

Additionally, in the case where the timer value change trigger is the "the number of neighboring cells" and there are lots of cells near the cell where the mobile station 2 is located, the interference becomes great and the communication error easily occurs. Accordingly, the rule is set to make the timer length short.

Further, in the case where the timer value change trigger is the "whether or not moving through TA (Tracking Area)" and the mobile station 2 is in the state of moving to another TA, a heavy processing load in the location registration or the like is generated. Since another process such as the reconnection process or the like should not be executed, the rule is set to make the timer length long.

Additionally, in the case where the timer value change trigger is the "moving speed" and the moving speed of the mobile station 2 is high, the belonging cell or the TA of the mobile station 2 is changed in a short period of time. Since the reconnection is more efficient, the rule is set to make the timer length short.

Further, in the case where the timer value change trigger is the "number of cell handovers" and there are a large number of the cell handovers, there is a high possibility that the belonging cell of the mobile station 2 is changed. Since the reconnection is more efficient, the rule is set to make the timer length short.

Additionally, in the case where the timer value change trigger is the "designation of the length of the timer from the network" and there is a designation of the length of the timer from a predetermined server in the network, the rule is set such that the timer length should have a designated value.

Moreover, the types of the timer value change triggers and the determination rules of the individual timer values are merely examples. For example, the determination rules of the individual timer values may be arranged for each bearer in connection.

The individual timer value determination unit 53 selects two or more timer value change triggers from multiple timer value change triggers stored in the timer value change trigger memory 51. The timer values for the respective timer value change triggers that have been selected are determined based upon the determination rule stored in the individual timer value determination rule memory 52. Herein, as a method of selecting the two or more timer value change triggers, all of the multiple timer value change triggers stored in the timer value change trigger memory 51 may be selected, the timer value change trigger that greatly influence QoS class, bearer in connection, or the like may be selected, or any timer value change trigger that is important for reduction of the pause or silent period in communication or reduction of the network load in the communication environment at each time may be selected.

The reconnection timer value calculation unit 54 calculates the reconnection timer value based upon the two or more individual timer values that have been determined by the individual timer value determination unit 53.

As a method of calculating the reconnection timer value, for example, the average value of the two or more timer values determined by the individual timer value determination unit 53 is calculated for the reconnection timer value. Alternatively, the two or more timer values determined by the individual timer value determination unit 53 are weighted respectively to calculate the average value of the timer values that have been weighted as the reconnection timer value. In the method of weighting, an example is multiplication of a big weighting coefficient on the timer values with respect to the important timer value change triggers such as a QoS class or the like.

Moreover, the method of calculating the reconnection timer value is not limited to the average value of the timer values. The reconnection timer value may be the standard deviation, central value, or sum of the two or more timer values, for example. In the calculation of the sum of the timer values, the respective timer values are simply added, or the respective timer values that have been weighted may be added. Also, under the assumption of addition, the timer values may be weighted, respectively.

(Operation)

Figure 6:
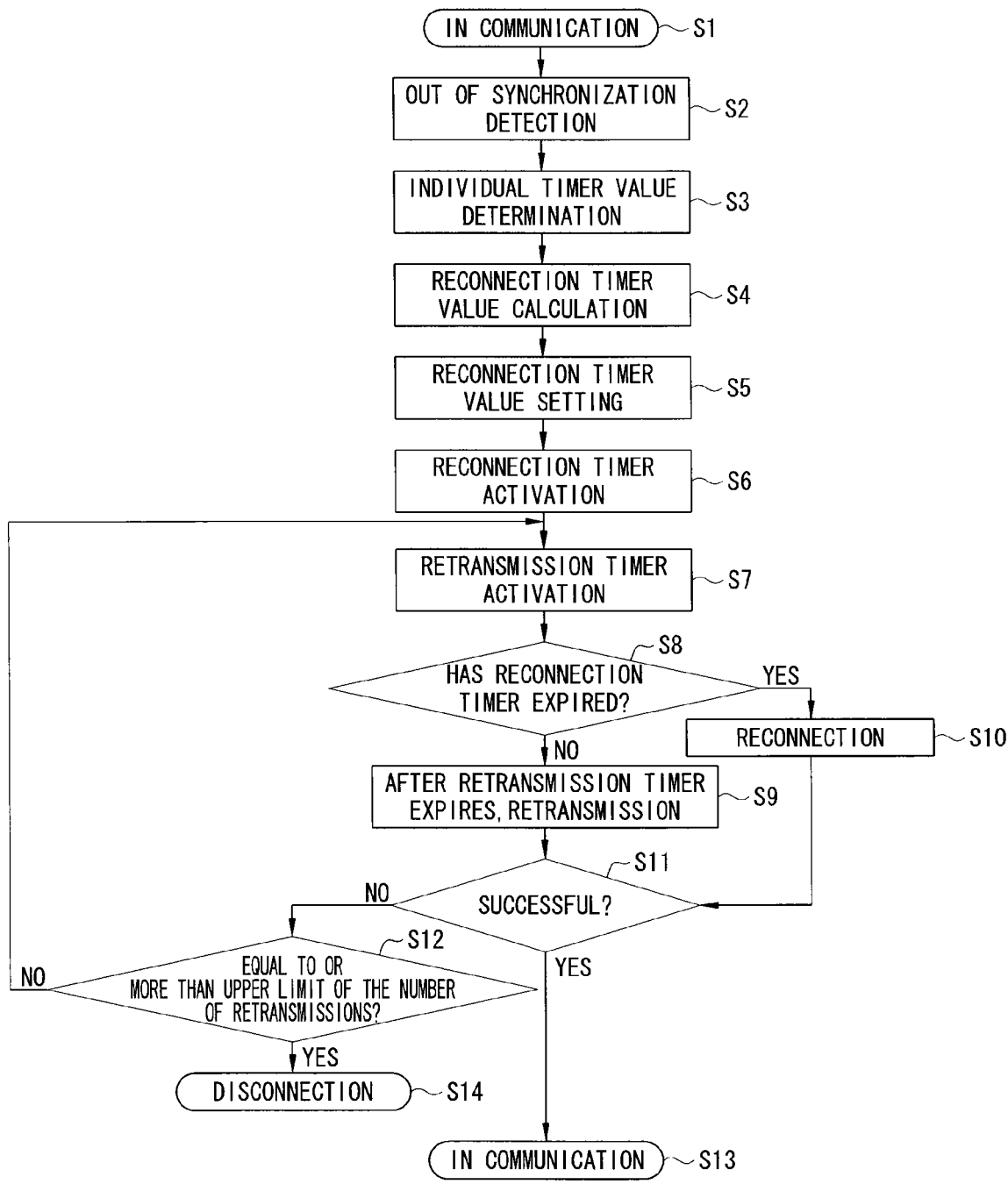
FIG. 6 is a flowchart illustrative of a process flow of the reconnection process according to an embodiment of the present invention.

Next, a description will be given, with reference to a flowchart illustrated in FIG. 6, of the operation of carrying out the reconnection process to a base transceiver station 1B of another cell due to the out of synchronization with the base transceiver station 1A of the belonging cell of the mobile station 2, as illustrated in FIG. 5. Specifically, in this description, 10 times is the upper limit of the number of the retransmissions to be carried out by the mobile station 2 to the base transceiver station 1A when the out of synchronization is detected, and three seconds are predetermined for a retransmission timer value. Accordingly, it is assumed that it takes 30 seconds or more to carry out the retransmission 10 times.

While the mobile station 2 is in communication (step S1), the out of synchronization detection unit 4 detects the out of synchronization in a case where no ACK for the data that the radio communication unit 3 has transmitted to the base transceiver station 1A is received (step S2).

When the out of synchronization is detected, the individual timer value determination unit 53 selects two or more timer value change triggers from the timer value change triggers stored in the timer value change trigger memory 51, and then determines each of the timer values for the respective timer value change triggers that have been selected, based upon the determination rule stored in the individual timer value determination rule memory 52 (step S3). The reconnection timer value calculation unit 54 calculates the reconnection timer value based upon the two or more timer values determined by the individual timer value determination unit 53 (step S4). In this situation, 30 seconds is assumed to be calculated for the reconnection timer value. The timer switching control unit 5 sets the reconnection timer value that has been calculated (step S5), the timer management unit 6 activates the reconnection timer (step S6), and further activates the retransmission timer (step S7).

The timer management unit 6 determines whether or not the reconnection timer has expired (step S8). When it is determined that the reconnection timer has not expired (step S8: NO), the radio communication unit 3 of the mobile station 2 carries out the retransmission to the base transceiver station 1A that the mobile station 2 originally belonged to, after the retransmission timer has expired (step S9). Conversely, when it is determined that the reconnection timer has expired (step S8: YES), the radio communication unit 3 transmits the reconnection request to the base transceiver station 1B of another cell to carry out the reconnection process (step S10).

When an ACK for the retransmitted data or the reconnection request is received and the communication can be continued (step S11: YES), the mobile station 2 is successful in making itself belong to a cell and changes its state to in communication (step S13).

On the other hand, when no ACK for the retransmitted data or the reconnection request is received (step S11: NO), the mobile station 2 determines whether or not the number of retransmissions is equal to or greater than the upper limit (step S12). When the number of retransmissions does not reach the upper limit (step S12: NO), the timer management unit 6 activates the retransmission timer again (step S7), and then repeats the processing from step S8 and later.

When the retransmission is carried out several times but the reconnection process is not successful in the meantime, about 30 seconds has passed since the detection of the out of synchronization, and the retransmission has been carried out more than 10 times of the upper limit of the number of retransmissions (step S12: YES), it is determined that any neighboring base transceiver station 1 that is connectable is not existent, and the radio communication unit 3 of the mobile station 2 disconnects the communication and becomes a call-waiting state (step S13).

Incidentally, when the reconnection process fails, the determination at step S12 can be omitted to disconnect the communication immediately.

As described heretofore, the mobile station 2 selects the two or more timer value change triggers from multiple timer value change triggers, and then determines each of the timer values with respect to the respective timer value change triggers that have been selected. Since the dimensions of such selected two or more timer values that have been determined are unified, the calculation of obtaining the average value or the like can be performed promptly, thereby making it possible to calculate an appropriate reconnection timer value with ease. It is therefore made possible to minimize a pause or silent period of time at the time of reconnection process for communication and to improve users' convenience. It is also made possible to suppress the number of reconnection processes or the number of cell searches to reduce the load applied onto the communication network and the mobile station 2, thereby making it possible to prevent the power consumption of the mobile station 2.

Moreover, in the above-described embodiments, a description has been given of the case where the reconnection request is transmitted to the base transceiver station 1 of another cell due to the out of synchronization with the base transceiver station 1 that manages the belonging cell of the mobile station 2. However, the technology described in the present description is applicable to the case where the reconnection request is transmitted to the base transceiver station 1 that manages the cell that was the belonging cell of the mobile station 2 due to the handover failure to the base transceiver station 1 of another cell.

In addition, in the above-described embodiments, a description has been given of the reconnection process during communication. However, the technology described in the present description is applicable to the connection process before the start of the communication.

EXPLANATION OF REFERENCES

1, 1A, 1B base transceiver station
2 mobile station
3 radio communication unit
4 out of synchronization detection unit
5 timer switching control unit
6 timer management unit
51 timer value change trigger memory
52 individual timer value determination rule memory
53 individual timer value determination unit
54 reconnection timer value calculation unit

The invention claimed is:

1. A mobile station that sets a single reconnection timer value to activate a timer at a time of a reconnection process of communication and that transmits a reconnection request to a connection target when the timer expires, the mobile station comprising:
   an individual timer value change trigger memory configured to store a plurality of types of individual timer value change triggers serving as triggers for changing a plurality of individual timer values, respectively;
   an individual timer value determination rule memory configured to store a plurality of types of determination rules different from each other, the plurality of types of determination rules being defined for each of the plurality of types of individual timer value change triggers stored in the individual timer value change trigger memory;
   an individual timer value determination unit configured to select at least two types of individual timer value change triggers from the plurality of types of individual timer value change triggers stored in the individual timer value change trigger memory, select at least two types of determination rules, defined for each of the at least two types of individual timer value change triggers, stored in the individual timer value determination rule memory, and determine at least two individual timer values respectively corresponding to each of the at least two types of selected individual timer value change triggers based upon the at least two types of selected determination rules; and
   a reconnection timer value calculation unit configured to calculate the single reconnection timer value based upon said at least two individual timer values determined by the individual timer value determination unit.

2. The mobile station according to claim 1, wherein the reconnection timer value calculation unit calculates an average value of said at least two individual timer values determined by the individual timer value determination unit, as the single reconnection timer value.

3. The mobile station according to claim 1 or 2, wherein the reconnection timer value calculation unit respectively weights said at least two individual timer values determined by the individual timer value determination unit, and then calculates the average value of the said at least two weighted individual timer values, as the single reconnection timer value.

4. The mobile station according to claim 1, wherein the plurality of types of individual timer value change triggers stored in the individual timer value change trigger memory include at least one of a QoS (Quality of Service) class, a bearer of the mobile station in connection, a data amount stored in a buffer memory provided in the mobile station, a data retransmission frequency, a throughput, a communication error quantity, presence of a radio wave interference, a number of neighboring cells, whether or not the mobile station moves through tracking areas, a moving speed of the mobile station, and the number of cell handovers.

5. A method of setting a single reconnection timer value to activate a timer at a time of a reconnection process of communication and transmitting a reconnection request to a connection target when the timer expires by a mobile station, the mobile station comprising an individual timer value change trigger memory configured to store a plurality of types of individual timer value change triggers serving as triggers for changing a plurality of individual timer values, respectively, and an individual timer value determination rule memory configured to store a plurality of types of determination rules different from each other, the plurality of types of determination rules being defined for each of the plurality of types of individual timer value change triggers stored in the individual timer value change trigger memory, the method comprising:
   selecting at least two types of individual timer value change triggers from the plurality of types of individual timer value change triggers stored in the individual timer value change trigger memory;
   selecting at least two types of determination rules, defined for each of the at least two types of individual timer value change triggers, stored in the individual timer value determination rule memory;
   determining at least two individual timer values respectively corresponding to each of the at least two types of selected individual timer value change triggers, based upon the at least two types of selected determination rules;
   calculating the single reconnection timer value to be used for counting a period of time until the reconnection request is transmitted, based upon said at least two individual timer values determined;
   activating the timer by setting at the timer the single reconnection timer value calculated; and
   transmitting the reconnection request to the connection target when the activated timer expires.

* * * * *